United States Patent

Henmi

[11] Patent Number: 5,977,742
[45] Date of Patent: Nov. 2, 1999

[54] ELECTRIC VEHICLE CONTROL DEVICE

[75] Inventor: Takuma Henmi, Kanagawa-ken, Japan

[73] Assignee: Kabushiki Kaisha Toshiba, Kawasaki, Japan

[21] Appl. No.: 09/248,312

[22] Filed: Feb. 11, 1999

[30] Foreign Application Priority Data

Mar. 12, 1998 [JP] Japan ............................. P10-061757

[51] Int. Cl.⁶ .................................................. B60L 3/00
[52] U.S. Cl. ....................... 318/801; 318/811; 318/778; 318/782; 361/23; 361/31; 361/33
[58] Field of Search ................... 318/782–792, 318/800–811, 430–434; 361/20–34

[56] References Cited

U.S. PATENT DOCUMENTS

| | | | |
|---|---|---|---|
| 4,785,225 | 11/1988 | Horie et al. | 318/811 |
| 4,825,131 | 4/1989 | Nozaki et al. | 318/52 |
| 4,914,386 | 4/1990 | Zocholl | 324/158 MG |
| 5,153,506 | 10/1992 | Trenkler et al. | 324/158 MG |
| 5,231,339 | 7/1993 | Kishimoto et al. | 318/807 |
| 5,248,926 | 9/1993 | Kotake et al. | 318/807 |
| 5,321,308 | 6/1994 | Johncock | 290/40 C |
| 5,446,362 | 8/1995 | Vanek et al. | 318/801 |
| 5,539,601 | 7/1996 | Farag | 361/23 |

*Primary Examiner*—Paul Ip
*Attorney, Agent, or Firm*—Oblon, Spivak, McClelland, Maier & Neustadt, P.C.

[57] ABSTRACT

An electric vehicle control device controls an induction motor with a VVVF inverter. A first calculation means calculates a rotor-resistance correction value of the induction motor based on a torque current instruction value for vector control of the induction motor and an actual torque current value. A second calculation means calculates a corrected rotor-resistance value based on the rotor-resistance correction value and a reference rotor-resistance value. A third calculation means calculates an estimated rotor temperature of the induction motor based on the corrected rotor-resistance value, the reference rotor-resistance value, and a temperature coefficient determined by a material of a rotor. The thermal condition of the induction motor is thus monitored in real time without installing a temperature sensor on the induction motor.

6 Claims, 9 Drawing Sheets

ELECTRIC VEHICLE CONTROL DEVICE

BACKGROUND OF THE INVENTION

1. Field of the Invention

The present invention relates to a control device for controlling an induction motor which drives an electric vehicle such as an electromotive railcar.

2. Description of the Related Art

FIG. 9 shows a conventional electric vehicle control device 1 for controlling an induction motor 53 which drives an electric vehicle such as an electromotive railcar.

A command controller 42 transforms a torque command sent by a motorman's cab controller 47 to a control signal 50 and sends the control signal to a VVVF (Variable Voltage and Variable Frequency) inverter 52. VVVF inverter 52 receives direct current (DC) power collected from an external power line via a pantogragh 51 and converts the DC power to a VVVF alternating current (AC) power in order to drive the induction motor 53.

At this time, the AC power is transformed into kinetic energy and core loss (iron loss and copper loss). The loss causes a heat rise in the induction motor. In general, a cruising pattern between stops is composed of power running (acceleration), coasting, regenerative brake, and stop stages. This pattern is repeated. In this case, the induction motor is provided AC power only during the power running and regenerative brake stages. The AC power is not supplied during either the coasting or stop stages.

Moreover, since the induction motor is installed on a truck or bogie of electromotive railcar, the external form is restricted and users require further miniaturization and lighter weight. Therefore, the induction motor 53 is designed and produced with careful consideration to wind generated while coasting, cruising and stopping.

However, as the driving operation extends for a long time, the induction motor 53 becomes covered with dust due to the wind directed for cooling the induction motor 53. Further, according to driving conditions, the duration of the power running (acceleration), regenerative brake, coasting and stop stages changes. Consequently, a three-phase induction motor 53 is not cooled sufficiently, which causes a dielectric breakdown and burning in coils or the core of induction motor 53.

Moreover, since the induction motor installed on a truck of an electromotive railcar is required to be both restricted in external form and durable in extremely severe conditions, it is difficult to install a sensor such as a thermometer. Even if a sensor is set, it is very expensive.

Therefore, there is a possibility that the previous model of the control device causes a dielectric breakdown and burning, when temperature increases abnormally.

SUMMARY OF THE INVENTION

Accordingly, one object of this invention is to provide an electric vehicle control device that can monitor a thermal condition of an induction motor in real time without installing a temperature sensor such as a thermometer on the induction motor and improve reliability of the induction motor.

The object of this invention can be achieved by providing an electric vehicle control device controlling an induction motor with a VVVF inverter, comprising a first calculation means for calculating a rotor-resistance correction value of the induction motor based on a torque constituent current instruction value for vector control of the induction motor and an actual torque constituent current value, a second calculation means for calculating a revised rotor-resistance value based on the rotor-resistance correction value and a standard rotor-resistance value, and a third calculation means for calculating an estimated rotor temperature of the induction motor based on the revised rotor-resistance value, the standard rotor-resistance value, and a temperature coefficient depending on a material of a rotor, whereby the thermal condition of the induction motor is monitored in real time without installing a temperature sensor on the induction motor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
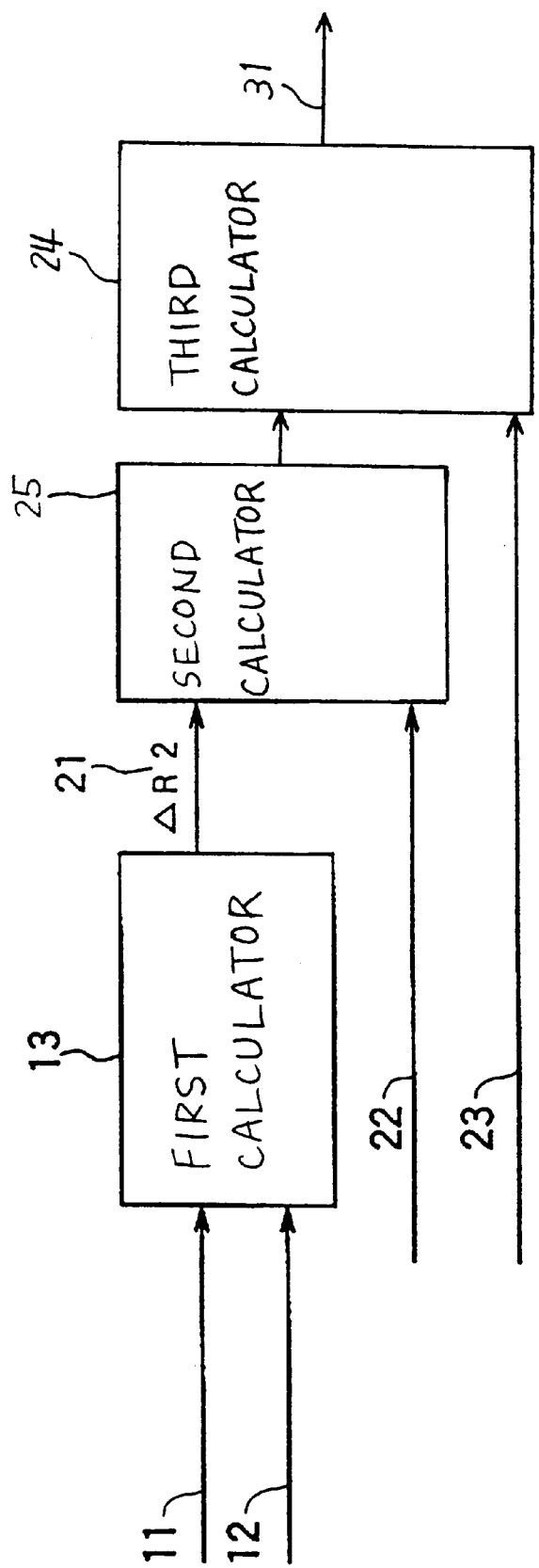
FIG. 1 is a block diagram showing calculators in an electric vehicle control device according to a first embodiment of the present invention.

Referring now to the drawings, wherein like reference numerals designate identical or corresponding parts throughout the several views, the embodiments of the present invention are described below.

FIG. 1 is a block diagram showing calculators in an electric vehicle control device according to a first embodiment of the present invention.

In this embodiment, a vector control command calculator (not shown) in an electric vehicle control device calculates both a torque current instruction value which generates the torque for driving an induction motor and a flux current instruction value which generates the flux for driving the induction motor based on the torque current and the flux current for the induction motor in order to drive the induction motor with a vector control. A first calculator 13, then calculates a rotor-resistance correction value 21 of the induction motor based on the torque current instruction value 11 from the vector control command calculator and an actual torque current value 12, which is a current flowing on the induction motor, as follows:

$$\Delta R2 = (Kp \times 2 + Ki)/s \times (IqRef - Iq)$$

ΔR2: rotor-resistance correction value 21
Kp: proportional gain coefficient
Ki: integral gain coefficient
s: differential operator
IqRef: torque current instruction value 11
Iq: actual torque current value 12

A second calculator 25 adds the rotor-resistance correction value (ΔR2) 21 and a reference rotor-resistance value (R2s) 22, and the second calculator 25 has a corrected rotor-resistance value (R2) as follows:

$$R2 = R2s + \Delta R2$$

R2: corrected rotor-resistance value
R2s: reference rotor-resistance value 22
ΔR2: rotor-resistance correction value 21

The reference rotor-resistance value (R2s) 22 is a resistance value of a rotor at a normal temperature.

A third calculator 24 calculates an estimated rotor temperature 31 based on the corrected rotor-resistance value (R2), the reference rotor-resistance value (R2s) 22, and a temperature coefficient (k) 23 determined by the material of the rotor, as follows:

$$T = (Ts - k + (R2/R2s) \times k)$$

T: estimated rotor temperature 31
Ts: temperature at reference rotor-resistance value
k: temperature coefficient 23 determined by the material of the rotor
R2: corrected rotor-resistance value
R2s: reference rotor-resistance value 22

As a result, the second calculator 25 calculates the corrected rotor-resistance value (R2), and the third calculator 24 estimates the temperature of the rotor and calculates the estimated rotor temperature 31 in real time. Accordingly, the thermal condition of the induction motor is monitored in real time without installing a temperature sensor such as a thermometer on the induction motor.

Figure 2:
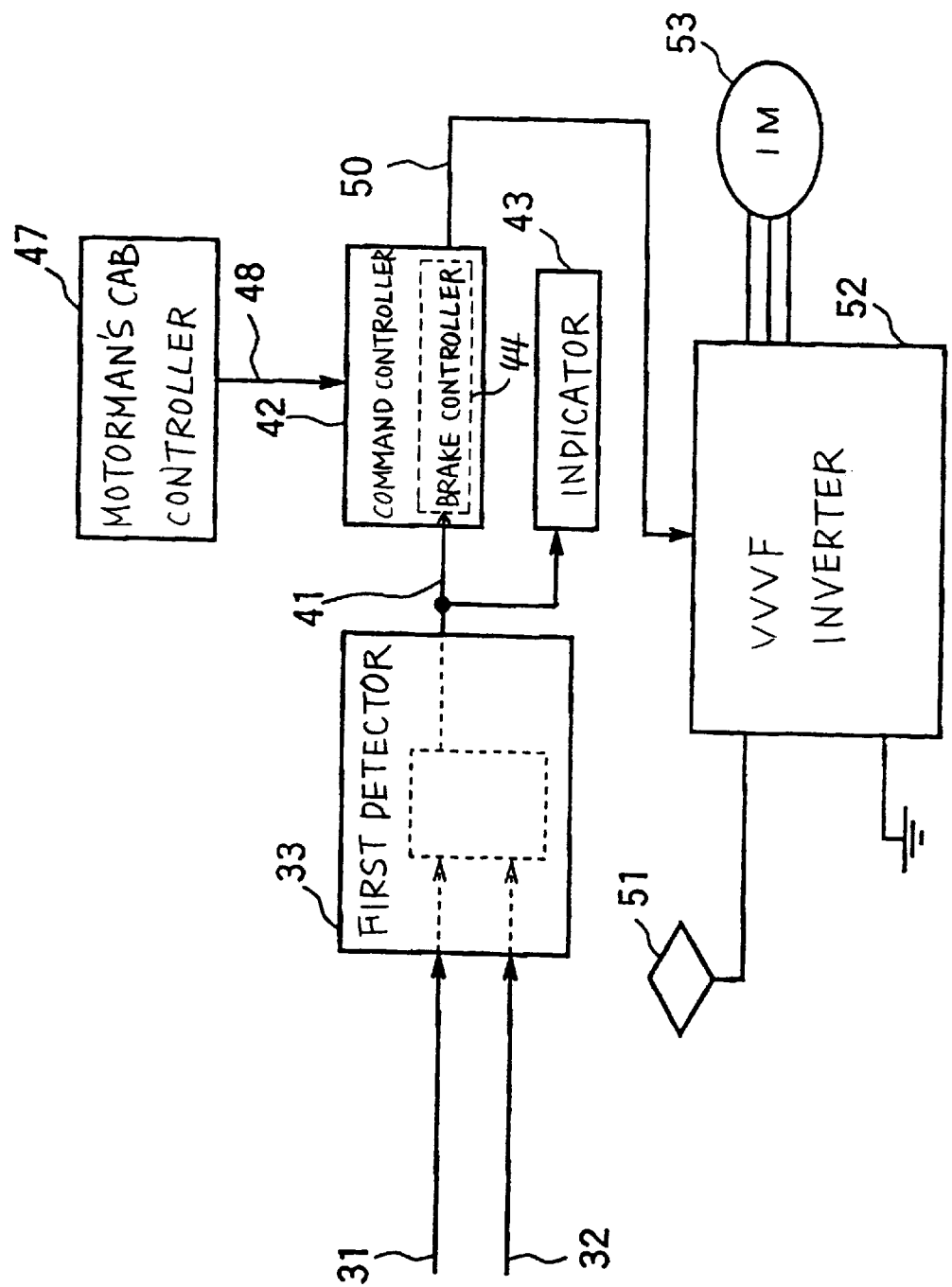
FIG. 2 is a block diagram showing a detector and controllers in an electric vehicle control device according to the first embodiment.

FIG. 2 is a block diagram showing an electric vehicle control device composed of a first detector 33, a command controller 42 including a brake controller 44, a motorman's cab controller 47, and a motorman's cab indicator 43 and VVVF inverter 52. The induction motor 53 and pantogragh 51 are also shown in FIG. 2.

The first detector 33 compares the estimated rotor temperature 31 with a first predetermined temperature such as a critical temperature 32 of the induction motor 53. If the estimated rotor temperature 31 exceeds the critical temperature 32, first detector 33 decides to stop a regenerative brake control and outputs a disconnecting signal 41 to the brake controller 44, and the first detector 33 indicates the disconnecting signal 41 at the motorman's cab indicator 43 in order to inform a motorman of the abnormal temperature of the induction motor 53.

When the brake controller 44 inputs the disconnecting signal 41, the brake controller 44 outputs a control signal 50 to the VVVF inverter 52 in order to disconnect the regenerative brake control. In this way, the command controller 42 operates as brake control means.

Figure 3:
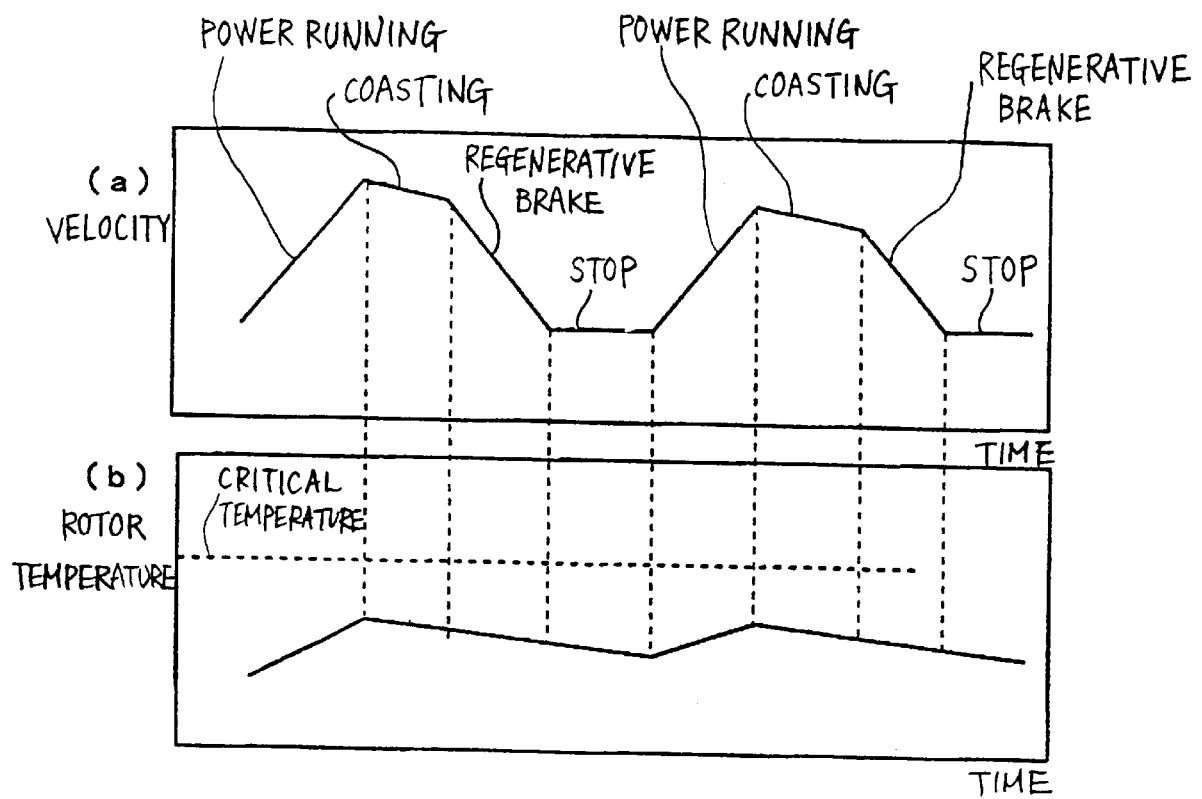
FIG. 3 is a phase sequence diagram showing the relationship between the cruising pattern and a rotor temperature at the time the regenerative control is disconnected.

FIG. 3 is a phase sequence diagram showing the relationship between the cruising pattern and the rotor temperature at the time the regenerative brake control is disconnected. In FIG. 3, graph (a) shows a velocity of an electric vehicle such as an electromotive railcar. Graph (b) shows the rotor temperature of the electric vehicle.

Figure 4:
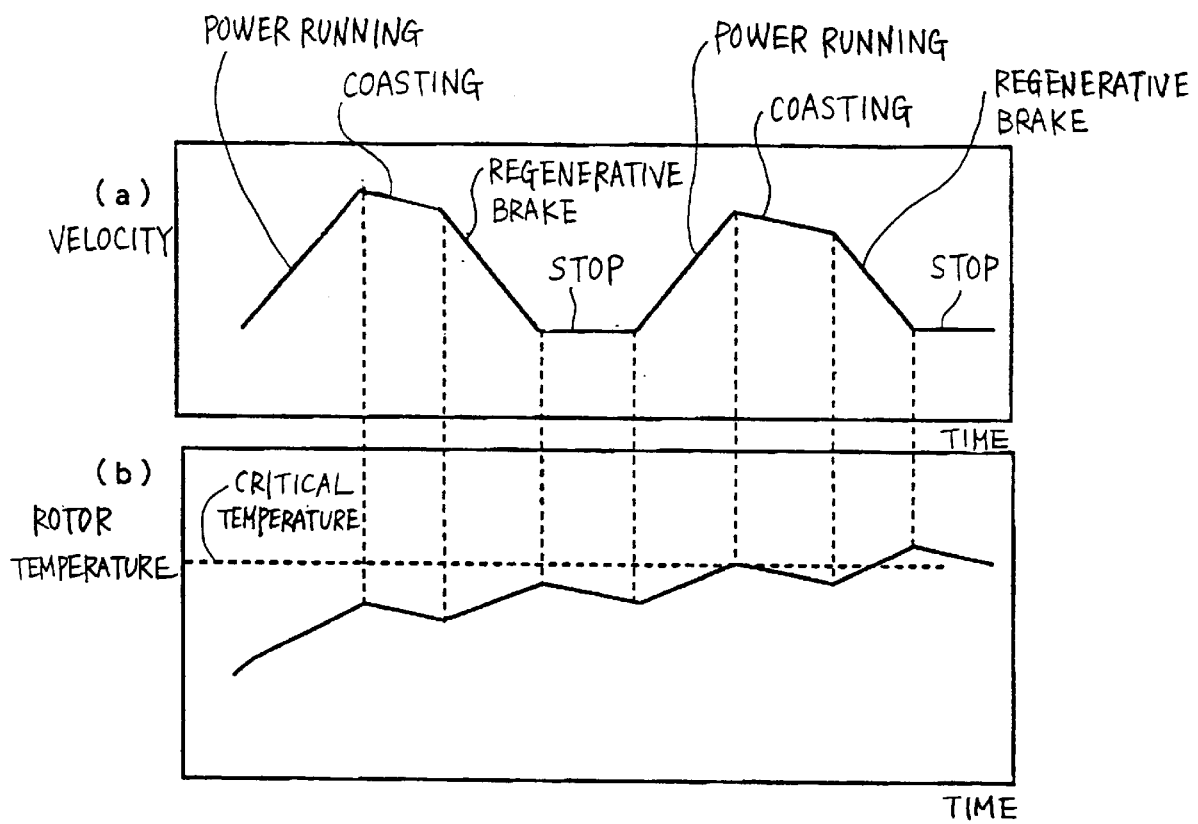
FIG. 4 is a phase sequence diagram showing the relationship between the cruising pattern and the rotor temperature at the time a regenerative control is not disconnected.

FIG. 4 is a phase sequence diagram showing the relationship between the cruising pattern and the rotor temperature at the time the regenerative brake control is not disconnected. In FIG. 4, graph (a) shows the velocity of an electric vehicle such as an electromotive railcar. Graph (b) shows the rotor temperature of the electric vehicle.

An ordinary electric vehicle is unable to detect an abnormal temperature of the rotor. Therefore, as shown in FIG. 4, the ordinary electric vehicle repeats the cruising pattern composed of the power running, coasting, regenerative brake and stop stages even when rotor temperature is abnormal. As a result, the rotor temperature repeats the cycle of rising during the power running stage, dropping during the coasting stage, rising during the regenerative braking stage and dropping during the stop stage.

On the other hand, when the regenerative brake control is disconnected, as shown in FIG. 3, the rotor temperature rises only during power running stage in the cycle. Consequently, the average temperature of the rotor drops. Especially, directed wind in coasting operates to cool the rotor, which is very effective for lowering the rotor temperature.

Figure 5:
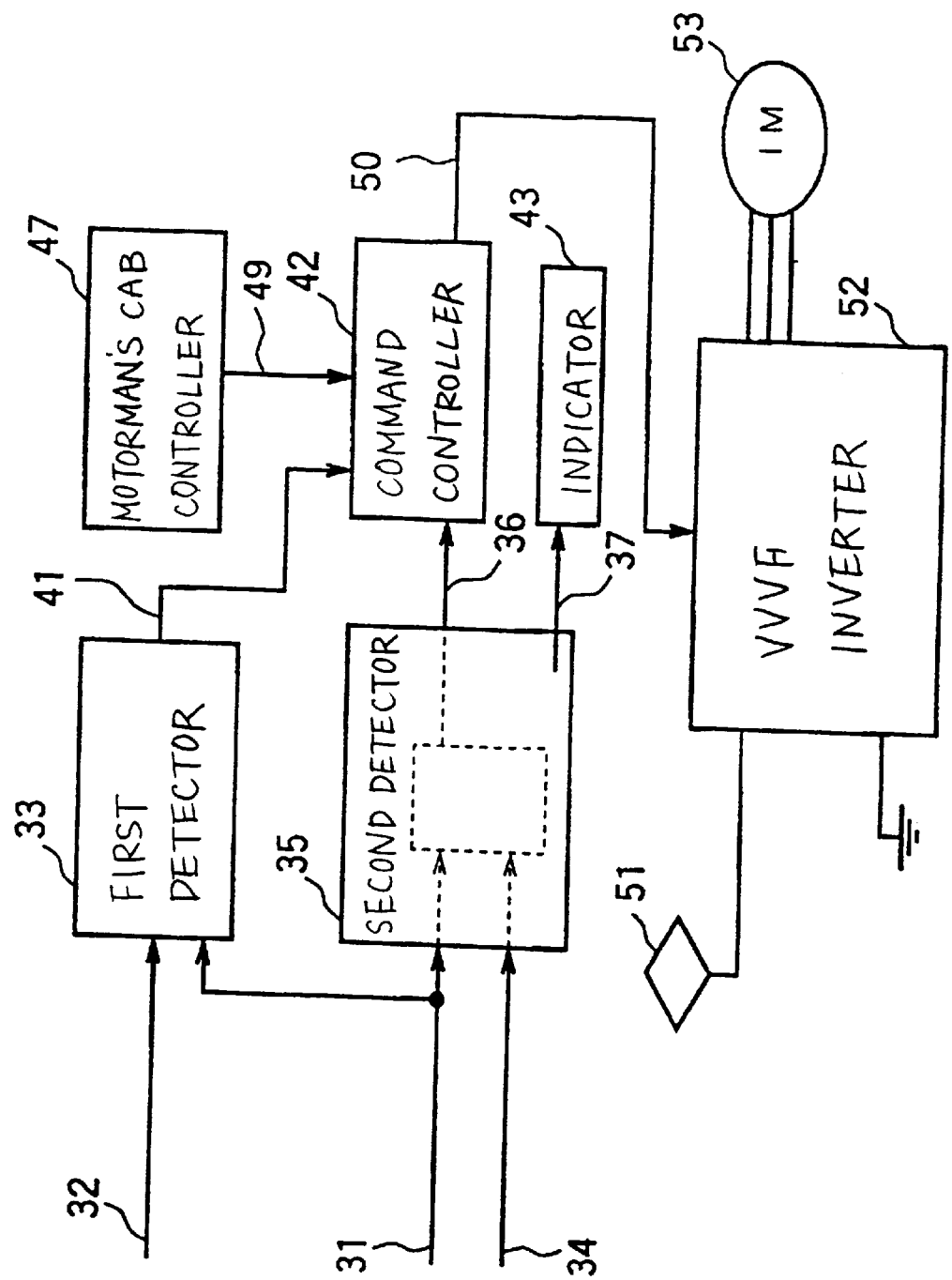
FIG. 5 is a block diagram showing detectors and controllers in an electric vehicle control device according to a second embodiment of the present invention.

FIG. 5 is a block diagram showing a second embodiment of an electric vehicle control device. In this embodiment, a second detector 35 is added to the first embodiment. The second detector 35 compares the estimated rotor temperature 31 with a second predetermined temperature 34. In case the estimated rotor temperature 31 exceeds the second predetermined temperature 34, the second detector 35 outputs an overload prohibiting signal 36 to the command controller 42 and outputs a maintenance required signal 37 to the motorman's cab indicator 43. The cooling ability for the induction motor 53 drops off as time passes. Therefore, it is expected that an abnormal temperature will be detected beforehand. A second predetermined temperature for requiring maintenance of the induction motor 53 is then set not to be over the critical temperature of the induction motor 53 in normal operation, which is the cruising pattern consisting of the power running, coasting, regenerative brake and stop stages. Accordingly, the second predetermined temperature is less than the first predetermined temperature as mentioned above.

The motorman's cab indicator 43 indicates the necessity of maintenance and requires maintenance of the induction motor 53 after closing operation.

While the command controller 42 is inputting the overload prohibiting signal 36, the command controller 42 outputs a control signal 50 to disconnect a signal which makes the induction motor 53 overload only when the command controller 42 inputs a signal such as a high-acceleration signal from the motorman's cab controller 47, which suddenly increases the current of the induction motor 53. In this way, the control signal 50 is sent to the VVVF inverter 52 so as to disconnect the high-acceleration signal and to drive the induction motor 53. As a result, the command controller 42 functions as a command control means for the induction motor 53.

Figure 6:
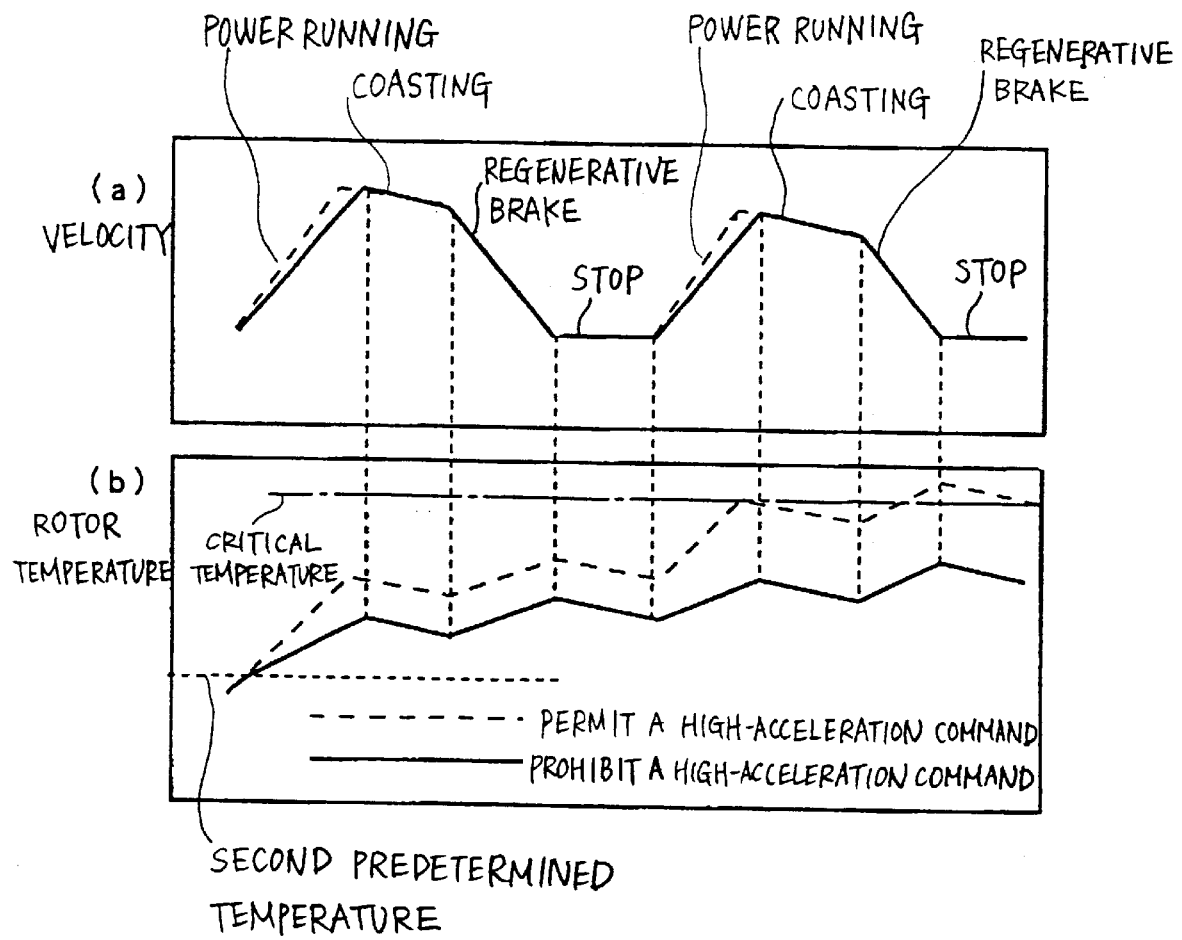
FIG. 6 is a phase sequence diagram showing the relationship between the cruising pattern and the rotor temperature at the time an induction motor is made to drive with high-acceleration.

FIG. 6 is a phase sequence diagram showing the relationship between the cruising pattern and the rotor temperature. FIG. 6 also shows a comparison between the case of setting the second predetermined temperature and the case of not setting the second predetermined temperature at the time the induction motor 53 is made to drive with high-acceleration. In FIG. 6, graph (a) shows a velocity of an electric vehicle such as an electromotive railcar. Graph (b) shows the rotor temperature of the electric vehicle.

If the induction motor 53 inputs the high-acceleration command which causes the induction motor 53 overload, the induction motor 53 repeats cycles of the power running, coasting, regenerative brake and stop stages with high acceleration. As a result, the rotor temperature exceeds the critical temperature, dielectric breakdown might occur in the rotor coil, and the coil could begin to burn.

On the other hand, if the induction motor 53 refuses to input the high-acceleration command, the rotor temperature does not exceed the critical temperature. Therefore, after closing operation, the induction motor 53 can be maintained in accordance with the maintenance requirement, and the induction motor 53 does not have an adverse influence on the operation of the electric vehicle. Further, if the rotor temperature should exceed the critical temperature, the regenerative brake is disconnected by means of the first detector 33 as described in the first embodiment. Accordingly, dielectric breakdown and burning in the coil of the induction motor 53 can be prevented.

Figure 7:
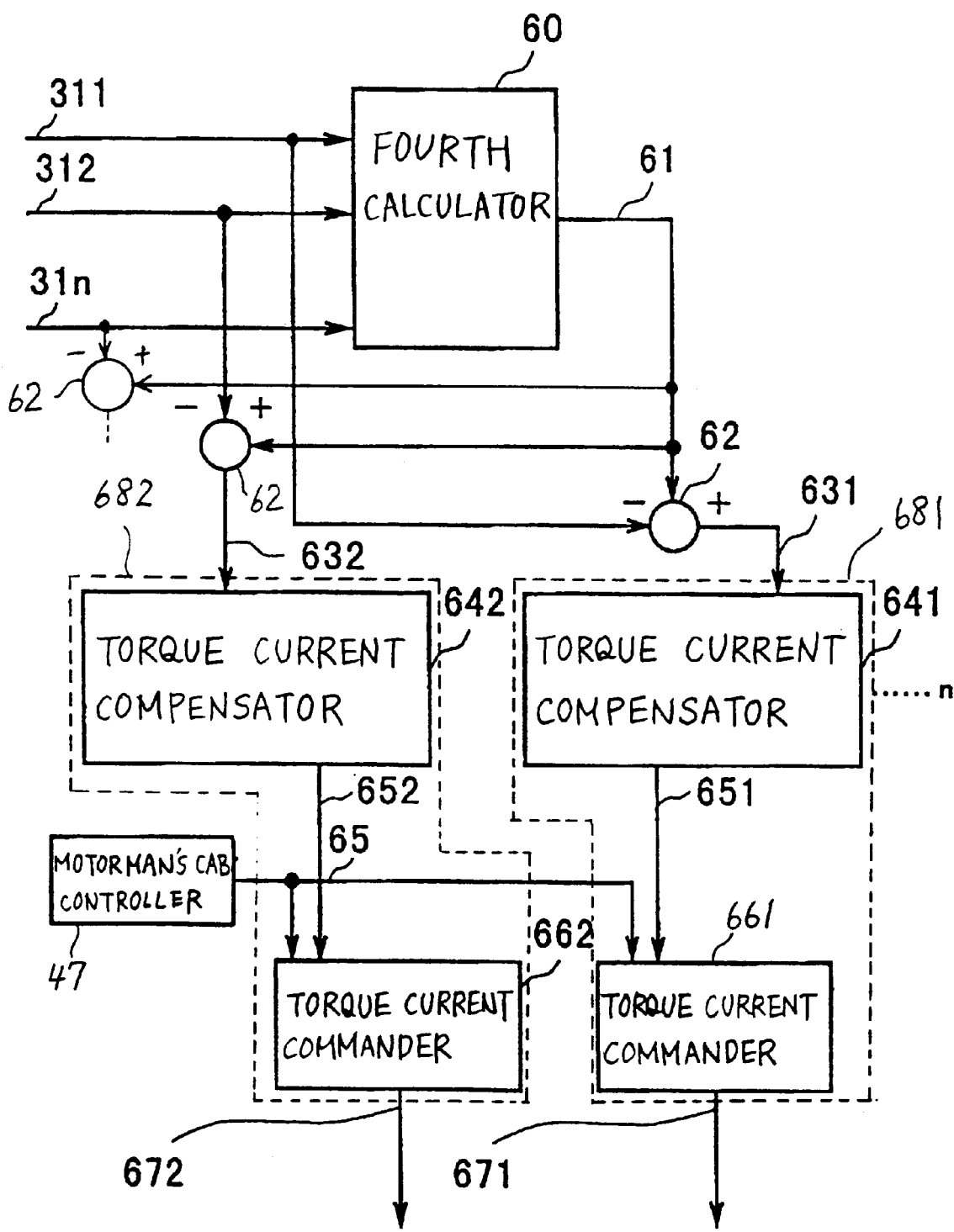
FIG. 7 is a block diagram showing calculators and controllers in an electric vehicle control device according to a third embodiment of the present invention.

FIG. 7 is a block diagram showing a third embodiment of an electric vehicle control device controlling a plurality of induction motors. In this embodiment, each of the estimated rotor temperatures 311 through 31n of induction motors 53 is calculated by the same method as in the first embodiment. A fourth calculator 60 calculates a reference estimated rotor temperature 61 by means of the following calculation on the basis of the estimated rotor temperatures 311–31n.

$$Ta=(T1 \times k1+T2 \times k2+ \ldots +Tn \times kn)/n$$

Ta: reference estimated rotor temperature 61 for n induction motors

T1: estimated rotor temperature 311 of No.1 induction motor

T2: estimated rotor temperature 312 of No.2 induction motor

: :
: :

Tn: estimated rotor temperature 31n of No. 1 induction motor k1: a compensation coefficient of No. 1 induction motor
k2: a compensation coefficient of No.2 induction motor
: :
: :
kn: a compensation coefficient of No.n induction motor
n: the number of induction motors The compensation coefficients differ depending on where the induction motors are installed.

As a result, the fourth calculator 60 calculates the average of the estimated rotor temperatures 311–31n. Then adders 62 calculate the differences between the reference estimated rotor temperature (Ta) 61 and each of the estimated rotor temperatures 311–31n.

Each of the fifth calculators 681, 682, . . . , 68n is respectively composed of one of the torque current compensators 641, 642, . . . , 64n and one of the torque current commanders 661, 662, . . . , 66n. The torque current compensators 641–64n respectively calculate each of the torque current compensating values 651, 652, . . . , 65n of the induction motors 53 with the following calculation.

$$\Delta IqRef=k \times (Ts-Tn)$$

ΔIqRef: torque current revising value of No.n induction motor

Ts: reference estimated rotor temperature for n induction motors

Tn: estimated rotor temperature of No.n induction motor k: coefficient

The torque current commanders 661, 662, . . . , 66n respectively calculate each of the compensated torque current instruction values 671, 672, . . . , 67n of the induction motors 53 based on the torque current instruction value and the current compensating values 651–65n with the following calculation in order to adjust a rotor temperature.

$$IqRef1=(IqRef2+\Delta IqRef)/IqRef2$$

IqRef 1: compensated torque current instruction values 671–67n

IqRef 2: torque current instruction value 65 from a mortorman's cab controller 47

Therefore, the fifth calculators 681–68n function as a fifth calculation means for compensating the torque current instruction value 65 of the induction motors 53. For example, when a rotor temperature of the No.1 induction motor increases abnormally, the torque current compensating value 651 becomes negative. As a result, the torque current compensating value 651 reduces the compensated torque current instruction value 671. On the contrary, when the rotor temperature of the No.1 induction motor decreases, the torque current compensating value 651 becomes positive. As a result, the torque current compensating value 651 increases the compensated torque current instruction value 671.

Accordingly, the electric vehicle control device keeps the total amount of the compensated torque current instruction values 671–67n constant. That is, the electric vehicle control system keeps an output of the vehicle having a plurality of induction motors constant. Further, the electric vehicle control device functions to minimize the dispersion of rotor temperatures and improve the reliability of the induction motor propelling heavy loads.

Figure 8:
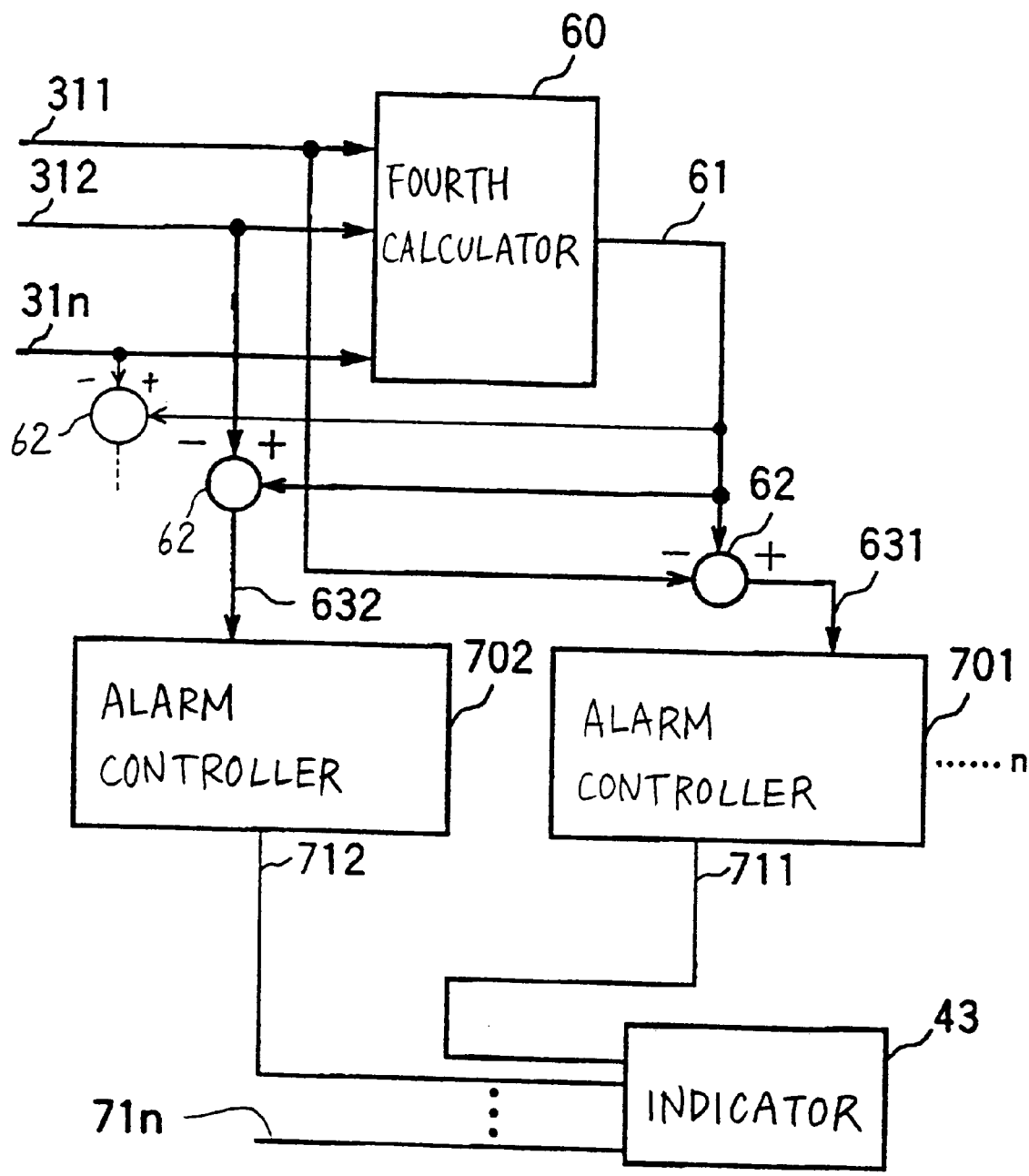
FIG. 8 is a block diagram showing a calculator and controllers in an electric vehicle control device according to a fourth embodiment of the present invention.
Figure 9:
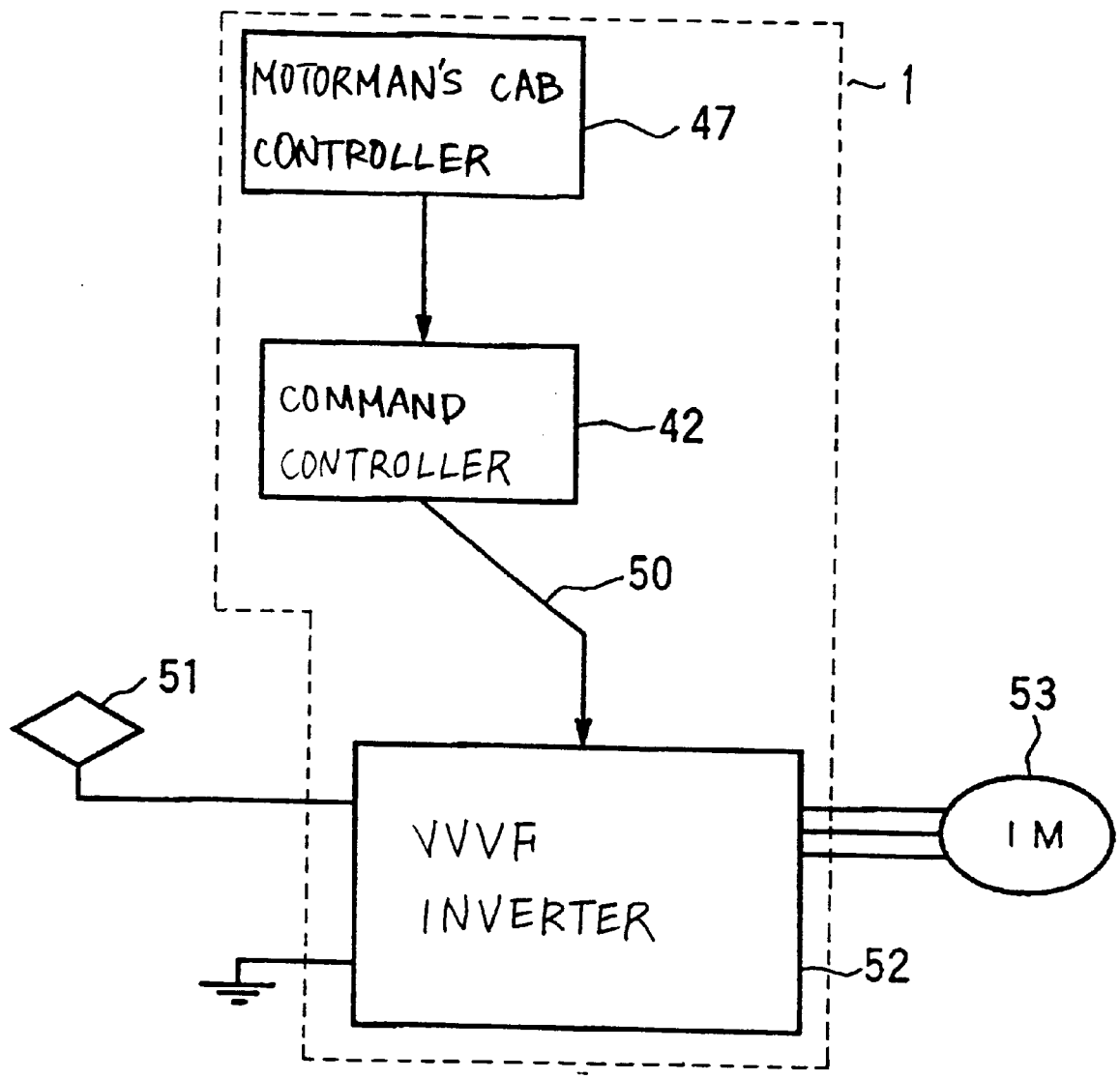
FIG. 9 is a block diagram showing a conventional electric vehicle control device.

FIG. 8 is a block diagram showing a fourth embodiment of an electric vehicle control device controlling a plurality of induction motors. In this embodiment, each estimated rotor temperature 311 through 31n of induction motors 53 is calculated by the same method as in the first embodiment. A fourth calculator 60 calculates a reference estimated rotor temperature 61 by means of the calculation described in the third embodiment. Adders 62 calculate differences between the reference estimated rotor temperature 61 and each of the estimated rotor temperatures 311–31n. Alarm controllers 701, 702, . . . , 70n detect if any differences 631, 632, . . . , 63n exceed a predetermined value, which is a temperature that reduces the cooling ability of the induction motors 53. Then, if any differences 631–63n exceed the predetermined value, alarm controllers 701–70n make the motorman's cab indicator 43 indicate maintenance requiring instructions 711, 712, . . . ,71n.

According to this embodiment, the alarm controllers 701–70n function to inform that maintenance is required. Even if the cooling ability of at least one of the induction motors 53 falls, all induction motors can be searched and maintained.

According to this invention, it is possible to provide an electric vehicle control device which can survey the thermal condition of an induction motor in real time without installing a temperature sensor such as a thermometer on the induction motor, and improve reliability of the induction motor.

Numerous modifications and variations of the present invention should be apparent to those of ordinary skill in the art in light of the above teachings. It is therefore to be understood that within the scope of the appended claims, the invention may be practiced otherwise than as specifically described herein.

What is claimed is:

1. An electric vehicle control device for controlling an induction motor with a VVVF inverter, comprising:

first calculation means for calculating a rotor-resistance correction value of said induction motor based on a torque current instruction value for vector control of said induction motor and an actual torque current value;

second calculation means for calculating a corrected rotor-resistance value based on said rotor-resistance correction value and a reference rotor-resistance value; and third calculation means for calculating an estimated rotor temperature of said induction motor based on said corrected rotor-resistance value, said reference rotor-resistance value, and a temperature coefficient determined by a material of a rotor.

2. The electric vehicle control device as recited in claim 1, further comprising:

detecting means for detecting that said estimated rotor temperature exceeds a predetermined temperature; and brake control means for disconnecting a regenerative brake control of said induction motor at the time said detecting means detects that said estimated rotor temperature exceeds said predetermined temperature.

3. The electric vehicle control device as recited in claim 1, further comprising:

detecting means for detecting that said estimated rotor temperature exceeds a predetermined temperature which is less than a critical temperature of said induction motor; and alarming means for informing of a necessity of maintenance of said induction motor at the time said detecting means detects that said estimated rotor temperature exceeds said predetermined temperature.

4. The electric vehicle control device as recited in claim 1, further comprising:

detecting means for detecting that said estimated rotor temperature exceeds a predetermined temperature which is less than a critical temperature of said induction motor; and command control means for disconnecting a high-acceleration command which makes said induction motor overload at the time said detecting means detects that said estimated rotor temperature exceeds said predetermined temperature.

5. An electric vehicle control device controlling a plurality of induction motors each having a VVVF inverter, comprising:

first calculation means for calculating a rotor-resistance correction values for each induction motor based on torque current instruction values for vector control of said induction motors and actual torque current values;

second calculation means for calculating a corrected rotor-resistance value for each induction motor based on said rotor-resistance correction values and reference rotor-resistance values;

third calculation means for calculating an estimated rotor temperature for each induction motor based on said corrected rotor-resistance values, said reference rotor-resistance values, and temperature coefficients determined by materials of the rotors;

fourth calculation means for calculating a reference estimated rotor temperature based on said estimated rotor temperatures; and fifth calculation means for calculating a compensated torque current instruction value for each induction motor based on a difference between said reference estimated rotor temperature and one of said estimated rotor temperatures.

6. An electric vehicle control device controlling a plurality of induction motors each having a VVVF inverter, comprising:

first calculation means for calculating a rotor-resistance correction value for each induction motor based on torque current instruction values for vector control of said induction motors and actual torque current values;

second calculation means for calculating a corrected rotor-resistance value for each induction motor based on said rotor-resistance correction values and reference rotor-resistance values;

third calculation means for calculating an estimated rotor temperature for each induction motor based on said corrected rotor-resistance values, said reference rotor-resistance values, and temperature coefficients determined by materials of rotors;

fourth calculation means for calculating a reference estimated rotor temperature based on said estimated rotor temperatures; and alarming means for informing of a necessity of maintenance of said induction motors if a difference between said reference estimated rotor temperature and one of said estimated rotor temperatures exceeds a predetermined value.

* * * * *